(12) United States Patent
Abalharth et al.

(10) Patent No.: US 10,290,137 B2
(45) Date of Patent: May 14, 2019

(54) AUTO-GENERATION OF MAP LANDMARKS USING SENSOR READABLE TAGS

(71) Applicant: Saudi Arabian Oil Company, Dhahran (SA)

(72) Inventors: Mahdi Abalharth, Dammam (SA); Hussain M. Alnasser, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/420,581

(22) Filed: Jan. 31, 2017

(65) Prior Publication Data
US 2018/0218524 A1   Aug. 2, 2018

(51) Int. Cl.
| | | |
|---|---|---|
| *G06T 3/40* | (2006.01) |
| *G06T 11/60* | (2006.01) |
| *G06K 9/46* | (2006.01) |
| *G06K 19/06* | (2006.01) |
| *G06K 11/04* | (2006.01) |
| *G01C 21/36* | (2006.01) |
| *G06K 9/00* | (2006.01) |

(52) U.S. Cl.
CPC .......... *G06T 11/60* (2013.01); *G01C 21/3602* (2013.01); *G06K 9/0063* (2013.01); *G06K 9/4604* (2013.01); *G06K 11/04* (2013.01); *G06K 19/06028* (2013.01); *G06K 2209/27* (2013.01)

(58) Field of Classification Search
CPC . G06T 11/60; G06K 9/4604; G06K 19/06028
See application file for complete search history.

(56) References Cited

U.S. PATENT DOCUMENTS

| 7,248,285 B2 | 7/2007 | Needham |
|---|---|---|
| 7,590,259 B2 | 9/2009 | Levy et al. |

(Continued)

FOREIGN PATENT DOCUMENTS

| DE | 102014016550 | 5/2016 |
|---|---|---|
| EP | 2323362 A2 | 5/2011 |
| EP | 2738519 | 6/2014 |

OTHER PUBLICATIONS

ConnecticutHistory.org' [online], "Road Signs of the Air," available on or before May 3, 2014, [retrieved Aug. 12, 2016], retrieved from: URL <https://connecticuthistory.org/road-signs-of-the-aid>, 19 pages.

(Continued)

*Primary Examiner* — Gregory M Desire
(74) *Attorney, Agent, or Firm* — Fish & Richardson P.C.

(57) ABSTRACT

An image of a geographical area is generated, the geographical area including at least one sensor-readable tag (SRT). The image of the geographical area includes images of the at least one SRT. Each SRT is associated with a landmark and encoded with label information of the landmark. Images of the at least one SRT are extracted from the image of the geographical area. For each of the at least one SRT, the label information of the landmark is decoded based on the extracted image of the SRT. A geographical label layer is generated including the label information of each landmark. A superimposed image is generated by superimposing the geographical label layer on the image of the geographical area.

20 Claims, 4 Drawing Sheets

(56) References Cited

U.S. PATENT DOCUMENTS

| | | | | |
|---|---|---|---|---|
| 9,652,681 | B1* | 5/2017 | Tucker | G06K 9/3241 |
| 9,939,813 | B2* | 4/2018 | Shashua | G01C 21/32 |
| 2004/0239688 | A1 | 12/2004 | Kraejec | |
| 2005/0063563 | A1 | 3/2005 | Soliman | |
| 2006/0267803 | A1* | 11/2006 | Mathis | G01C 21/367 |
| | | | | 340/995.15 |
| 2012/0038633 | A1* | 2/2012 | Clark | G06T 17/05 |
| | | | | 345/419 |
| 2015/0317597 | A1 | 11/2015 | Shucker et al. | |
| 2016/0300375 | A1* | 10/2016 | Beckett | G06T 3/4092 |
| 2016/0366546 | A1* | 12/2016 | Yamasaki | H04W 4/02 |
| 2017/0371897 | A1* | 12/2017 | Strong | G06F 17/30241 |

OTHER PUBLICATIONS

International Search Report and Written Opinion issued in International Application No. PCT/US2018/015887 dated Apr. 30, 2018, 14 pages.

\* cited by examiner

AUTO-GENERATION OF MAP LANDMARKS USING SENSOR READABLE TAGS

BACKGROUND

Existing image sensors (for example, cameras or satellite-based sensors) usually acquire raster images for geographical areas which do not include attribute information of landmarks within the covered areas. Generating an image (such as an aerial photo or a satellite image) that shows names of landmarks usually requires overlaying a geographical label layer containing the landmark names on the image acquired by the sensor. The geographical label layer can be built in many different ways. For example, it can be built by a digitizer using information obtained from surveyors collecting geographical coordinates, similar to information used for commercial maps in navigation systems. The geographical label layer can also be built by crowdsourcing mechanisms where a website is available to public or private groups that create or update landmark names and corresponding geographical location or other information. However, these approaches can result in incomplete, outdated, or inaccurate landmark names.

SUMMARY

The present disclosure describes methods and systems, including computer-implemented methods, computer program products, and computer systems for auto-generation of map landmarks using sensor readable tags (SRTs).

In an implementation, an image of a geographical area is generated, the geographical area including at least one SRT. The image of the geographical area includes images of the at least one SRT. Each SRT is associated with a landmark and encoded with label information of the landmark. Images of the at least one SRT are extracted from the image of the geographical area. For each of the at least one SRT, the label information of the landmark is decoded based on the extracted image of the SRT. A geographical label layer is generated including the label information of each landmark. A superimposed image is generated by superimposing the geographical label layer on the image of the geographical area.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented so as to realize one or more of the following advantages. First, the described approach can automatically and quickly generate information for landmarks in a geographical area based on physical SRTs as sensors acquire images of the geographical area. The real-time or near-real-time production of smart maps including landmark information can help in geo-referencing images on-the-fly and making the images available for highly demanding applications, such as security and emergency applications. Second, the described approach can automatically build a geographical label layer including up-to-date landmark information that comes from credible sources such as the landmark owners and provides a global source of unified landmarks that rely on physical properties. Third, the landmark information generated based on the SRTs can be used by autonomous airborne vehicles (UAVs) as "traffic signs" assisting in navigating, adherence to speed or elevation restrictions, and to avoid no entry zones. For example, as a UAV hovers over a geographical area, the generated landmark information indicates that an area ahead of the UAV is a no-entry zone and the UAV can avoid the zone accordingly or transmit a request for entry approval or an existing approval permitting entry to the zone. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
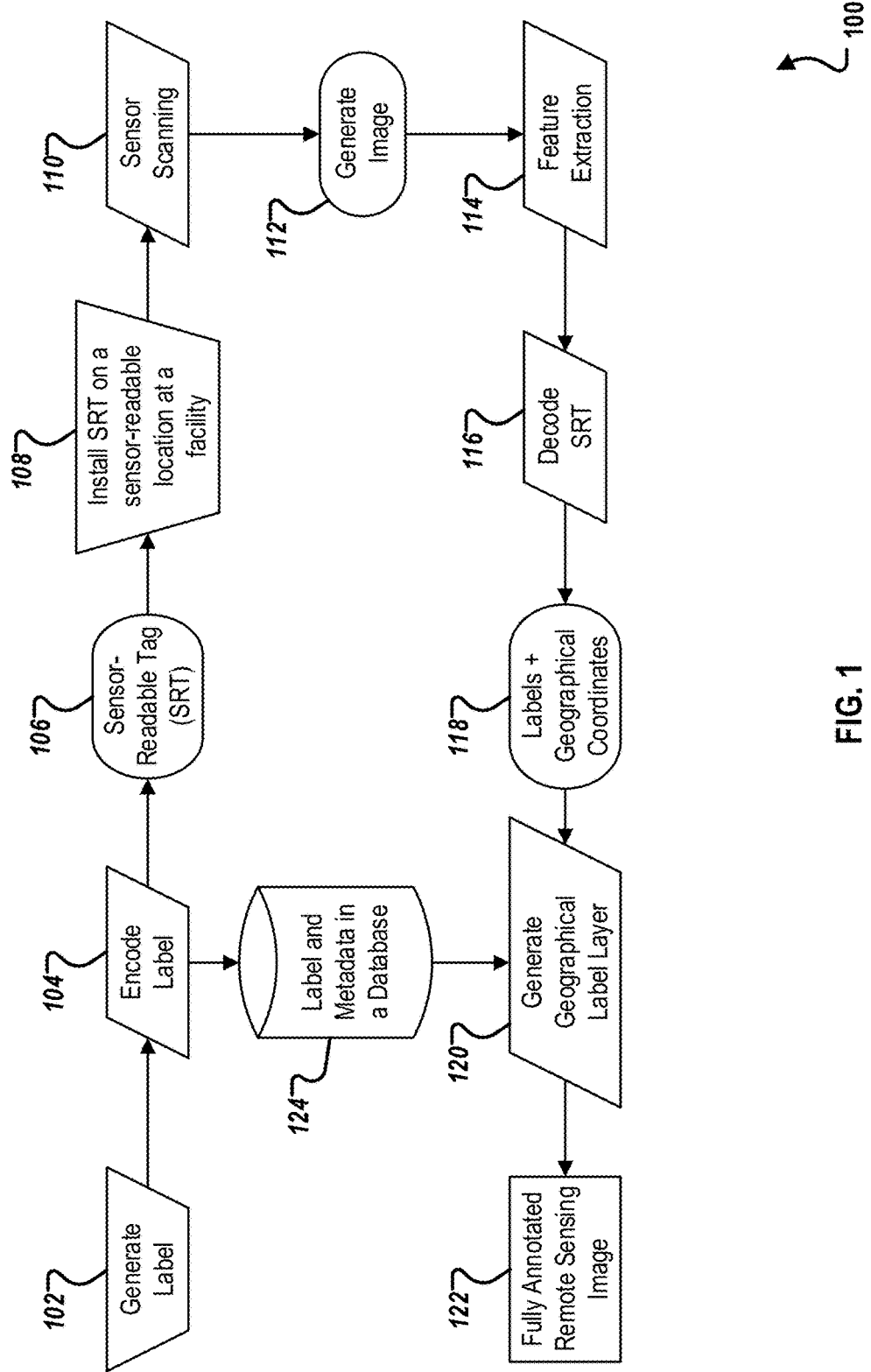
FIG. 1 is a flowchart illustrating an example method for auto-generation of map landmarks using sensor readable tags, according to an implementation.

The following detailed description describes auto-generation of map landmarks using sensor-readable tags (SRTs) and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

Existing image sensors (for example, cameras or satellite-based sensors) usually acquire raster images for geographical areas which do not include attribute information of landmarks within the covered areas. Generating an image (such as an aerial photo or a satellite image) that shows names of landmarks usually requires overlaying a geographical label layer containing the landmark names on the image acquired by the sensor. The geographical label layer can be built in many different ways. For example, it can be built by a digitizer using information obtained from surveyors collecting geographical coordinates, similar to information used for commercial maps in navigation systems. The geographical label layer can also be built by crowdsourcing mechanisms where a website is available to public or private groups that create or update landmark names and corresponding geographical location or other information. However, these approaches can result in incomplete, outdated, or inaccurate landmark names.

At a high-level, the described approach provides a mechanism to swiftly transform images acquired by a sensor or camera into intelligent images or maps with rich information such as landmark labels, leading to less post-processing. The described approach generates landmark labels in real time based on physical tags installed on the landmarks that can be captured by the sensor. The physical tags, called SRTs, can be encoded with landmark information. For example, the SRT can be in a barcode format encoded with the landmark name, geographical coordinate, or both. Attributes and additional information of the landmark that cannot be accommodated in the SRT can be stored in a database. When a sensor acquires images of a geographical area, images of SRTs are captured. The SRT images can be extracted from the images acquired by the sensor and used to decode the landmark information. For example, the extracted SRT images can be analyzed to determine the barcode on the SRTs and decode the landmark information. Based on the decoded landmark information, attributes and additional information of landmarks can be retrieved from the database to generate landmark labels. The generated landmark labels can be superimposed to the image acquired by the sensor to generate an intelligent image or map annotated with landmark information. In some implementations, the sensor can identify a unique shape or signature (such as the barcode on the SRT). For example, images acquired by the sensor are in high-resolution such that the barcode on the SRT can be identified.

The described approach has a number of use cases. For instance, a sensor on an unmanned aerial vehicle (UAV) is acquiring images of a city and as the images are transferred to a ground station, the described approach enables automatic generation of landmark information such as street names, government offices, communities' names that can be used to annotate the images acquired by the sensor. With the real-time tag decoding, the described approach enables real-time display of landmark information about the scenes covered by the sensor. For example, in an emergency situation where a UAV is hovering over a scene, the ground station associated with the UAV can display a map with up-to-date landmark information of the scene, providing information to emergency staff. As another example, as a UAV hovers over a geographical area, generated landmark information can indicate that an area ahead of the UAV is a no-entry zone and the UAV can avoid the zone accordingly or transmit a request for entry approval or an existing approval permitting entry to the zone. The described approach can be used not only by airborne or space-borne sensors such as sensors on UAVs or satellites, but may also be applied to any sensor including smart phones or mobile devices that have visibility to physical tags installed on landmarks.

FIG. 1 is a flowchart illustrating an example method 100 for auto-generation of map landmarks using SRTs, according to an implementation. For clarity of presentation, the description that follows generally describes method 100 in the context of the other figures in this description. However, it will be understood that method 100 may be performed, for example, by any suitable system, environment, software, and hardware, or a combination of systems, environments, software, and hardware as appropriate. In some implementations, various steps of method 100 can be run in parallel, in combination, in loops, or in any order.

At 102, the landmark, property, or facility owner generates a label for a landmark. For example, the label can include the name of the landmark, such as a petroleum refinery or a commercial building. The label can also include additional information or metadata associated with the landmark, such as date of construction, owner, landmark category, services the landmark provides, telephone number, geographical coordinate, and boundary information (for example, boundary of a building, property, zone, or region). The boundary information of a landmark can include geographical coordinates of vertices or other data that define the landmark boundary. From 102, method 100 proceeds to 104.

At 104, the landmark label is encoded in an SRT. For example, both the name and geographical coordinate of the landmark can be encoded in the SRT. The additional information or metadata associated with the landmark can also be encoded in the SRT. In some implementations, additional information or metadata that cannot be accommodated in the SRT encoding can be stored in a database 124. In some implementations, the database can be accessed through a hyperlink or other data pointer encoded in the SRT.

In typical implementation, the SRT can be encoded in a format such as a one-dimensional barcode, two-dimensional barcode, quick response (QR) code, or other encoded format. For instance, landmark information can be encoded into a QR code accommodating up to 4296 alphanumeric characters. In typical implementations, each SRT can have a unique feature, signature, shape, or size (for example, a unique barcode) to differentiate different landmarks. For example, buildings could be marked with one form of SRT while geographic formations can be marked with another. From 104, method 100 proceeds to 106.

At 106, an SRT is created after encoding the landmark information into the SRT. The SRT can be created in multiple formats, shapes, or sizes based on the targeted landmark. For example, a larger format SRT can be used to mark a large building roof, while a smaller format SRT can be used to mark a street, vehicle, geographical formation, etc.

In some implementations, an SRT service provider can provide services, for example, through a web site, so that landmark owners can provide and update the landmark information. Upon receiving the landmark information, the SRT service provider can generate an SRT encoded with the provided information and store the information that cannot be accommodated in the SRT in the database. In some implementations, an SRT issuing software can be used to generate SRTs and storing metadata, and the landmark owner can use the SRT issuing software to print or build the SRT. From 106, method 100 proceeds to 108.

At 108, the SRT is installed at a location on the landmark that can be seen by sensors. For example, the SRT can be installed on the rooftop of a building. From 108, method 100 proceeds to 110.

At 110, a sensor (for example, an airborne sensor on a UAV) scans a geographical area of interest including SRTs and captures images of the area. The sensor can identify or capture the unique feature, signature, shape, or size of the SRT. For example, the sensor can form high-resolution images to identify the barcode on SRTs. The sensor can be a passive or active sensor. For example, an active sensor can emit electromagnetic waveforms (for example, in spectrum of ultraviolet, visible range, infrared, short-wavelength infrared, or thermal-infrared) and gather waveforms reflected by the geographical area including the SRTs. The reflected waveforms can be processed using various signal processing techniques to form images of the geographical area. For a passive sensor, the sensor can collect reflected sunlight when the sun is illuminating the earth and form images of the area. From 110, method 100 proceeds to 112.

At 112, images of the geographical area are generated. The generated images include images of SRTs in the area. In some cases, the UAV can include an onboard computing device to process the waveforms received by the sensor and generate remote sensing images. In some cases, the computing device can be at a ground station. The sensor on the UAV can send the received waveforms to the ground station to generate remote sensing images. From 112, method 100 proceeds to 114.

At 114, feature extraction techniques are used to process the generated images to extract embedded SRT images. For example, image pixels associated with SRTs can be extracted. The extracted SRT images or image pixels are passed to an SRT decoding module. From 114, method 100 proceeds to 116.

At 116, the SRT decoding module decodes the SRTs based on the extracted SRT images. For example, the SRT decoding module can analyze each extracted SRT image and detect the barcode on each SRT. Based on the detected barcode, landmark information encoded in each SRT can be determined. From 116, method 100 proceeds to 118.

At 118, a list of landmark labels for the scanned geographical area is generated. The landmark labels can include information encoded in the SRTs. For example, based on the detected barcode on each SRT, a list of landmark names in the area and associated geographical coordinates can be determined if the information encoded in an SRT includes both the landmark name and geographical coordinate. From 118, method 100 proceeds to 120.

At 120, a geographical label layer is generated including the landmark information encoded in the SRTs and associated metadata from the database 124. For example, a computing device on the UAV or at the ground station can contact the database 124 to retrieve metadata associated with the landmarks in the area. In some implementations, if the hyperlink to the database is encoded in the SRT, the computing device can determine the hyperlink and access the database. In some cases, the landmark name and associated geographical coordinate are sent to the database and the database retrieves the information by comparing the received landmark name and coordinates with data stored in the database. In some cases, the detected barcode can be sent to the database and the database retrieves the landmark information based on the detected barcode. The computing device used to contact the database 124 can be the same or different computing device than the computing device used to generate remote sensing images at 112. From 120, method 100 proceeds to 122.

At 122, fully annotated images can be generated by overlaying or superimposing the geographical label layer on the images acquired by the sensor. For example, a software on a computing device can bring the geographical label layer and remote sensing imagery and generate a fully annotated image showing information of each landmark. The fully annotated images can be available to users on screen, through web page, or in a printed format. From 122, method 100 stops.

In some implementations, a UAV can include a sensor, the database 124, and a computing device that can generate remote sensing images of a geographical area, extract SRT images, decode SRTs, and retrieve information from the database 124. In these cases, as the UAV scans the geographical area, the UAV can generate the fully annotated images in real time and send the fully annotated images to the ground station. In some implementations, the UAV can include the sensor and a computing device that is capable to generate remote sensing images of the geographical area. In these cases, the UAV can send the remote sensing images to the ground station, and let the ground station extract SRT images, decode SRTs, retrieve landmark metadata from the database 124, and generate the fully annotated images. In some other implementations, the UAV can include only the sensor, and the UAV can send the received waveforms or signals to the ground station and let the ground station do the processing to generate fully annotated images.

In some implementations, SRTs can help in geo-referencing images because the SRTs can be used as Ground Control Points (GCPs) to improve the accuracy of feature locations on the image. A number of spatial analysis tools exist to transform the acquired image to a more accurate processed image. The following two steps illustrate how SRTs can be used as GCPs to improve image accuracy:

1) Extract both coordinates for a single SRT on the image (the actual one from the database and the one from the image), and 2) Perform a proper spatial transformation to map the acquired image to the real geographical scene.

Figure 2:
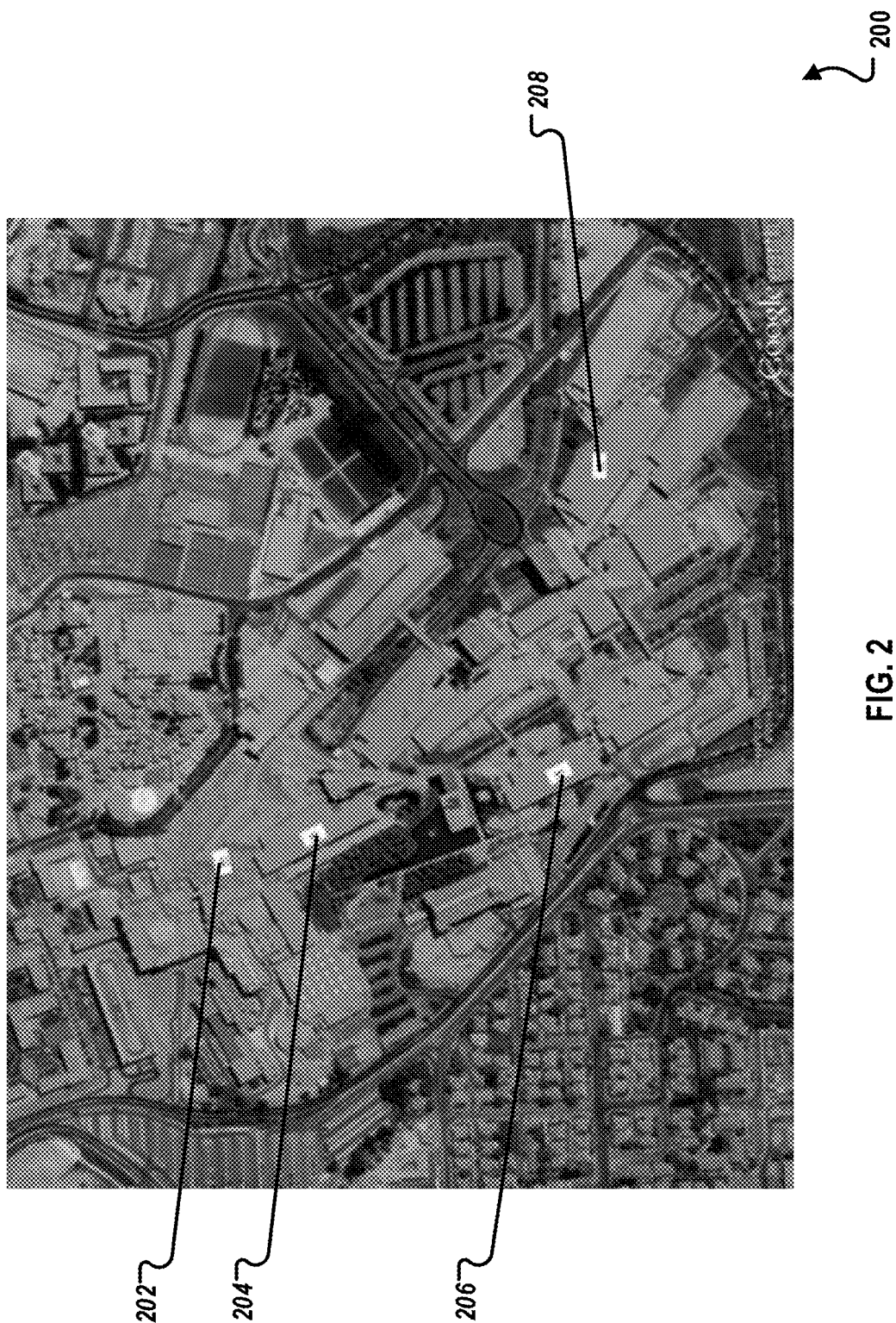
FIG. 2 is an image illustrating a remote sensing image, according to an implementation.

FIG. 2 is an image illustrating a remote sensing image 200, according to an implementation. The remote sensing image 200 is of a geographical area including a university campus with ten buildings. Four university buildings have been tagged with SRTs (here, 202, 204, 206, and 208) on their roofs.

Figure 3:
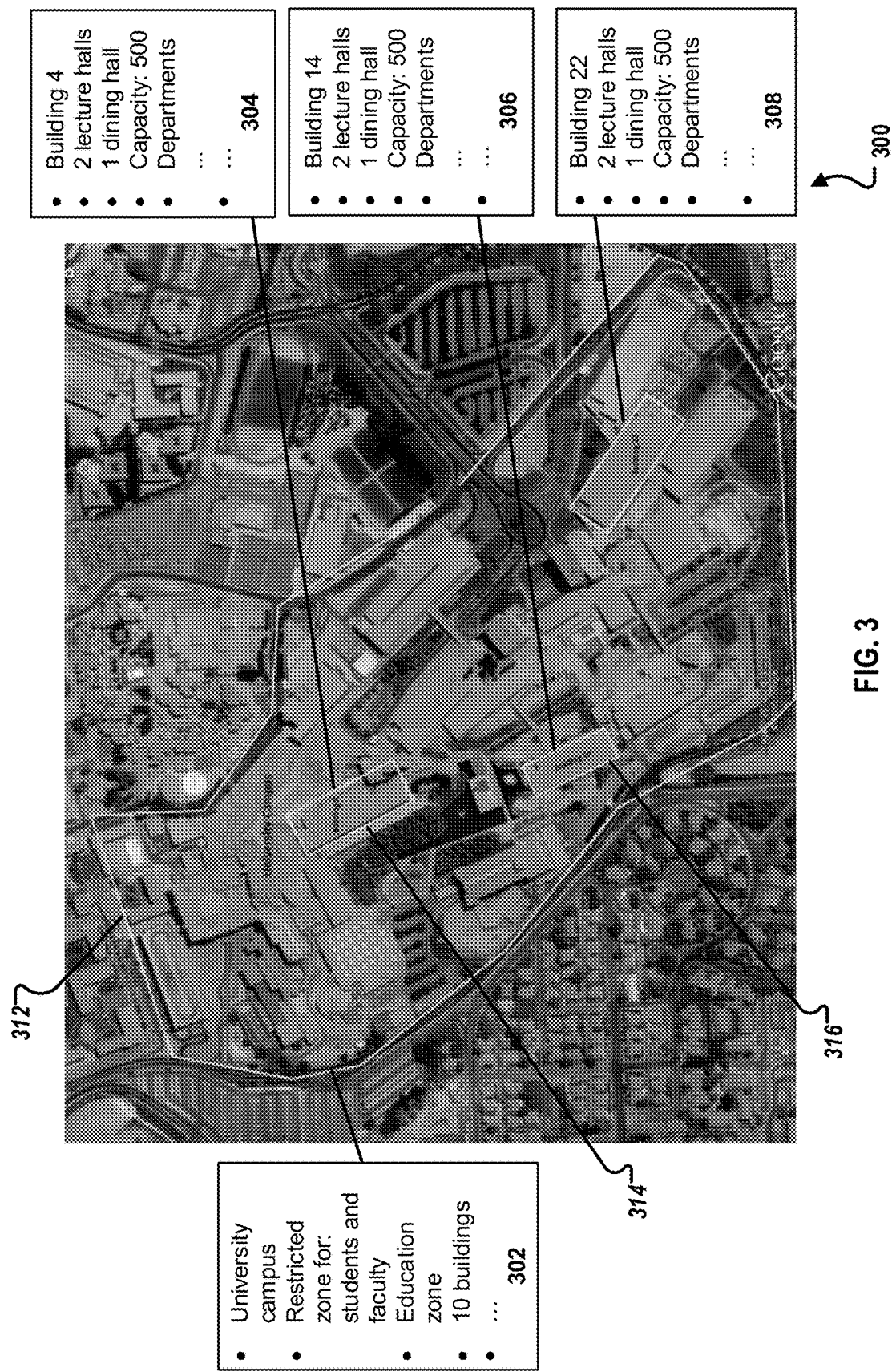
FIG. 3 is an image illustrating a fully annotated remote sensing image, according to an implementation.

FIG. 3 is an image illustrating a fully annotated remote sensing image 300, according to an implementation. The image 300 is an annotated version of the image 200, illustrating that the geographical area includes a university campus, and buildings 4, 14, and 22 of the campus. The image 300 includes a geographical label layer that includes landmark information and metadata such as the geographical boundary of landmarks. For example, the geographical label layer includes annotation labels 302, 304, 306, and 308 to show metadata of the university campus, buildings 4, 14, and 22, respectively. The annotation label 302 shows that the campus is a restricted education zone for students and faculty and has ten buildings. The geographical label layer also includes the boundaries 312, 314, 316, and 318 for the university campus and buildings 4, 14, and 22, respectively. The geographical label layer can also include the line connecting the annotation label and the corresponding landmark boundary (for example, the line connecting 302 and 312) or any other data consistent with this disclosure.

Figure 4:
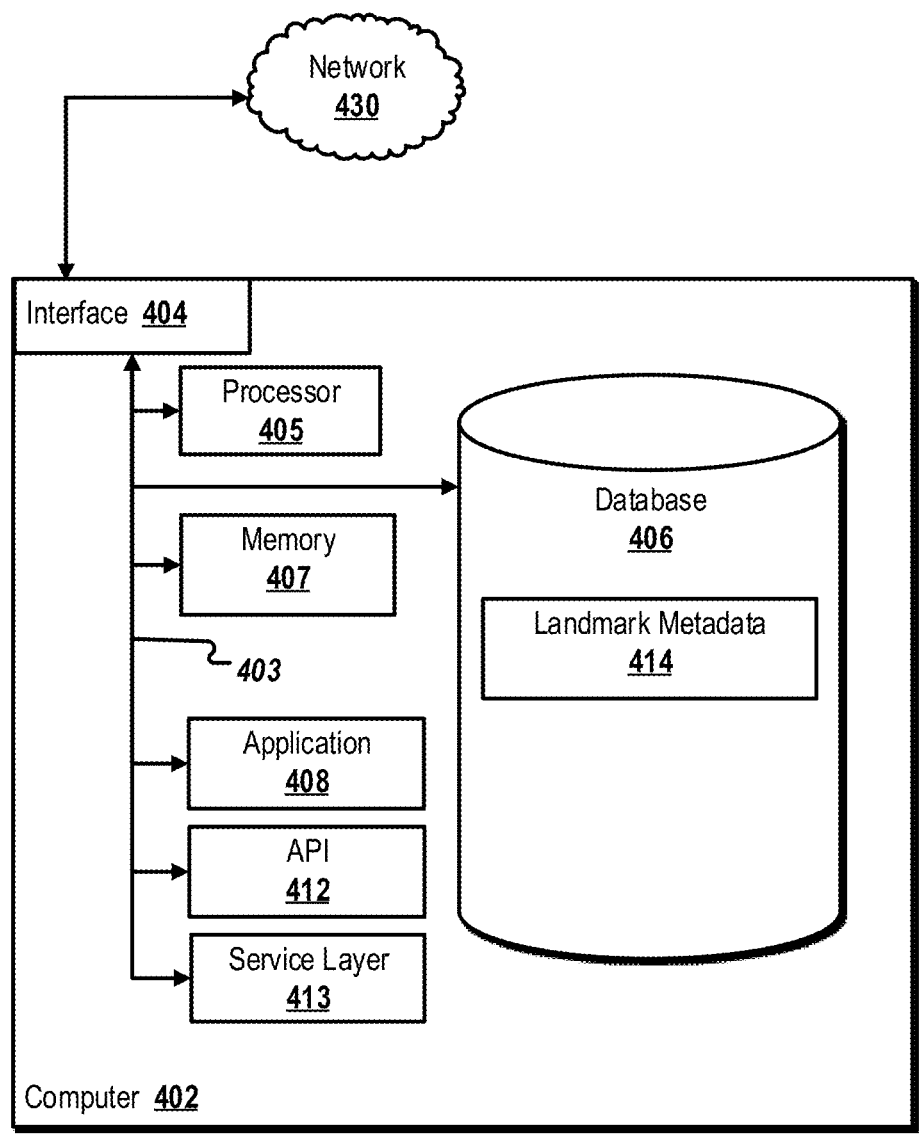
FIG. 4 is a block diagram illustrating an exemplary computer system used to provide computational functionalities associated with described algorithms, methods, functions, processes, flows, and procedures as described in the instant disclosure, according to an implementation.

FIG. 4 is a block diagram of an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402. For example, the database 406 can include landmark metadata 414.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, applications, etc. Further, although illustrated as a single application 408, the application 408 may be implemented as multiple applications on the computer 402. In addition, although illustrated as integral to the computer 402, in alternative implementations, the application 408 can be external to the computer 402.

There may be any number of computers 402 associated with, or external to, a computer system containing computer 402, each computer 402 communicating over network 430.

Further, the term "client," "user," and other appropriate terminology may be used interchangeably as appropriate without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method includes: generating an image of a geographical area, the geographical area including at least one SRT, the image of the geographical area including images of the at least one SRT, and each SRT associated with a landmark and encoded with label information of the landmark; extracting images of the at least one SRT from the image of the geographical area; for each of the at least one SRT, decoding the label information of the landmark based on the extracted image of the SRT; generating a geographical label layer including the label information of each landmark; and generating a superimposed image by superimposing the geographical label layer on the image of the geographical area.

The foregoing and other described implementations can each optionally include one or more of the following features:

A first feature, combinable with any of the following features, where the method further includes: retrieving metadata of each landmark from a database based on the decoded label information of each landmark; and including the metadata of each landmark in the geographical label layer.

A second feature, combinable with any of the previous or following features, where the metadata includes geographical boundary of the landmark.

A third feature, combinable with any of the previous or following features, where the sensor is an airborne sensor.

A fourth feature, combinable with any of the previous or following features, where the sensor uses a particular electromagnetic spectrum to generate the image of the geographical area.

A fifth feature, combinable with any of the previous or following features, where the label information of the landmark includes a name of the landmark.

A sixth feature, combinable with any of the previous or following features, where the label information of the landmark is encoded in the SRT in a format of barcode.

In a second implementation, a non-transitory, computer-readable medium storing one or more instructions executable by a computer system to perform operations including: generating an image of a geographical area, the geographical area including at least one SRT, the image of the geographical area including images of the at least one SRT, and each SRT associated with a landmark and encoded with label information of the landmark; extracting images of the at least one SRT from the image of the geographical area; for each of the at least one SRT, decoding the label information of the landmark based on the extracted image of the SRT; generating a geographical label layer including the label information of each landmark; and generating a superimposed image by superimposing the geographical label layer on the image of the geographical area.

The foregoing and other described implementations can each optionally include one or more of the following features:

A first feature, combinable with any of the following features, comprising one or more instructions to: retrieve metadata of each landmark from a database based on the decoded label information of each landmark; and include the metadata of each landmark in the geographical label layer.

A second feature, combinable with any of the previous or following features, where the metadata includes geographical boundary of the landmark.

A third feature, combinable with any of the previous or following features, where the sensor is an airborne sensor.

A fourth feature, combinable with any of the previous or following features, where the sensor uses a particular electromagnetic spectrum to generate the image of the geographical area.

A fifth feature, combinable with any of the previous or following features, where the label information of the landmark includes a name of the landmark.

A sixth feature, combinable with any of the previous or following features, where the label information of the landmark is encoded in the SRT in a format of barcode.

In a third implementation, a computer-implemented system includes a computer memory, and a hardware processor interoperably coupled with the computer memory and configured to perform operations including: generating an image of a geographical area, the geographical area including at least one sensor-readable tag (SRT), the image of the geographical area including images of the at least one SRT, and each SRT associated with a landmark and encoded with label information of the landmark; extracting images of the at least one SRT from the image of the geographical area; for each of the at least one SRT, decoding the label information of the landmark based on the extracted image of the SRT; generating a geographical label layer including the label information of each landmark; and generating a superimposed image by superimposing the geographical label layer on the image of the geographical area.

The foregoing and other described implementations can each optionally include one or more of the following features:

A first feature, combinable with any of the following features, further configured to: retrieve metadata of each landmark from a database based on the decoded label information of each landmark; and include the metadata of each landmark in the geographical label layer.

A second feature, combinable with any of the previous or following features, where the sensor is an airborne sensor.

A third feature, combinable with any of the previous or following features, where the sensor uses a particular electromagnetic spectrum to generate the image of the geographical area.

A fourth feature, combinable with any of the previous or following features, where the label information of the landmark includes a name of the landmark.

A fifth feature, combinable with any of the previous or following features, where the label information of the landmark is encoded in the SRT in a format of barcode.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    generating an image of a geographical area, the geographical area including at least one sensor-readable tag (SRT), the image of the geographical area including images of the at least one SRT, and each SRT associated with a landmark and encoded with label information of the landmark;
    extracting images of the at least one SRT from the image of the geographical area;
    for each of the at least one SRT, decoding the label information of the landmark based on the extracted image of the SRT;
    generating a geographical label layer including the label information of each landmark; and
    generating a superimposed image by superimposing the geographical label layer on the image of the geographical area.

2. The computer-implemented method of claim 1, further comprising:
    retrieving metadata of each landmark from a database based on the decoded label information of each landmark; and including the metadata of each landmark in the geographical label layer.

3. The computer-implemented method of claim 2, wherein the metadata includes geographical boundary of the landmark.

4. The computer-implemented method of claim 1, wherein the sensor is an airborne sensor.

5. The computer-implemented method of claim 1, wherein the sensor uses a particular electromagnetic spectrum to generate the image of the geographical area.

6. The computer-implemented method of claim 1, wherein the label information of the landmark includes a name of the landmark.

7. The computer-implemented method of claim 1, wherein the label information of the landmark is encoded in the SRT in a format of barcode.

8. A non-transitory, computer-readable medium storing one or more instructions executable by a computer system to perform operations comprising:
    generating an image of a geographical area, the geographical area including at least one sensor-readable tag (SRT), the image of the geographical area including images of the at least one SRT, and each SRT associated with a landmark and encoded with label information of the landmark;
    extracting images of the at least one SRT from the image of the geographical area;
    for each of the at least one SRT, decoding the label information of the landmark based on the extracted image of the SRT;
    generating a geographical label layer including the label information of each landmark; and
    generating a superimposed image by superimposing the geographical label layer on the image of the geographical area.

9. The non-transitory, computer-readable medium of claim 8, comprising one or more instructions to:
    retrieve metadata of each landmark from a database based on the decoded label information of each landmark; and
    include the metadata of each landmark in the geographical label layer.

10. The non-transitory, computer-readable medium of claim 9, wherein the metadata includes geographical boundary of the landmark.

11. The non-transitory, computer-readable medium of claim 8, wherein the sensor is an airborne sensor.

12. The non-transitory, computer-readable medium of claim 8, wherein the sensor uses a particular electromagnetic spectrum to generate the image of the geographical area.

13. The non-transitory, computer-readable medium of claim 8, wherein the label information of the landmark includes a name of the landmark.

14. The non-transitory, computer-readable medium of claim 8, wherein the label information of the landmark is encoded in the SRT in a format of barcode.

15. A computer-implemented system, comprising:
    a computer memory; and
    a hardware processor interoperably coupled with the computer memory and configured to perform operations comprising:
        generating an image of a geographical area, the geographical area including at least one sensor-readable tag (SRT), the image of the geographical area including images of the at least one SRT, and each SRT associated with a landmark and encoded with label information of the landmark;
        extracting images of the at least one SRT from the image of the geographical area;
        for each of the at least one SRT, decoding the label information of the landmark based on the extracted image of the SRT;
        generating a geographical label layer including the label information of each landmark; and
        generating a superimposed image by superimposing the geographical label layer on the image of the geographical area.

16. The computer-implemented system of claim 15, further configured to:
    retrieve metadata of each landmark from a database based on the decoded label information of each landmark; and
    include the metadata of each landmark in the geographical label layer.

17. The computer-implemented system of claim 15, wherein the sensor is an airborne sensor.

18. The computer-implemented system of claim 15, wherein the sensor uses a particular electromagnetic spectrum to generate the image of the geographical area.

19. The computer-implemented system of claim 15, wherein the label information of the landmark includes a name of the landmark.

20. The computer-implemented system of claim 15, wherein the label information of the landmark is encoded in the SRT in a format of barcode.

* * * * *